United States Patent [19]

Perry

[11] 4,381,042
[45] Apr. 26, 1983

[54] EXCESSIVE IDLE TERMINATION SYSTEM

[75] Inventor: John J. Perry, Huntsville, Ala.

[73] Assignee: Chrysler Corporation, Highland Park, Mich.

[21] Appl. No.: 224,417

[22] Filed: Jan. 12, 1981

[51] Int. Cl.³ .............................................. B60K 15/00
[52] U.S. Cl. ..................................... 180/272; 340/53; 368/6
[58] Field of Search ....................... 180/271, 272, 273; 340/52 R, 53, 527; 290/37 R, 37 A; 307/10 R; 368/6, 9, 10, 12

[56] References Cited

U.S. PATENT DOCUMENTS

| | | | |
|---|---|---|---|
| 3,500,946 | 3/1970 | Boyajian | 180/273 |
| 3,860,904 | 1/1975 | Anderson | 340/53 X |
| 4,136,329 | 1/1979 | Trobert | 340/53 X |
| 4,286,683 | 9/1981 | Zeigner et al. | 307/10 R X |
| 4,291,295 | 9/1981 | Arnold | 340/53 |

Primary Examiner—David M. Mitchell
Assistant Examiner—Michael Mar
Attorney, Agent, or Firm—Newtson & Dundas

[57] ABSTRACT

A system for use in shutting down a motor vehicle engine upon elapse of selected sensed input conditions, comprises an electronic digital counter which begins counting in response to the occurrence of any of the selected input conditions. Logic gates and warning devices are also associated with the counter circuit. When a predetermined count is reached, it is considered indicative of excessive idle, and consequently the ignition circuit is automatically interrupted to thereby shut down the engine and conserve fuel. Prior to the actual engine shutdown the warning devices may give a pre-warning of impending shutdown.

1 Claim, 7 Drawing Figures

EXCESSIVE IDLE TERMINATION SYSTEM

BACKGROUND AND SUMMARY OF THE INVENTION

This invention relates to an excessive idle termination system for use in motor vehicles.

Common to these systems is the objective of shutting down the engine upon an excessive idle condition so as to thereby conserve fuel and avoid needless operation of the engine. The systems sense one or more input conditions which are indicative of an idle condition and when a sensed condition has existed for a predetermined interval without correction, the system operates to interrupt the ignition circuit thereby shutting down the engine. Various types of warning systems may also be utilized in conjunction with the basic ignition interrupt system to alert the operator to an impending shutdown unless the condition which gave rise to idle indication abates. One typical input condition which is sensed to indicate an excess idle condition is the duration for which the operator's seat is left unoccupied while the engine is running. For example, in the case of a delivery vehicle where the operator is required to leave the vehicle for performing a delivery function, he may leave the vehicle in idle with the engine running. Upon his departure from the seat, the system detects the condition of unoccupiedness of the seat and commences a timing function which if, the seat is not reoccupied within the duration of the timing function, will interrupt the ignition circuit and hence cause the engine to be shut down. An example of such a prior art type of system is disclosed in U.S. Pat. No. 3,500,946 wherein a seat switch is connected as an input to a time delay relay with the time delay relay commencing its timing function upon the seat becoming unoccupied and the relay timing out if the seat is not reoccupied during the time delay period to thereby interrupt the ignition circuit and shut down the engine.

The present invention is directed to a new and improved excessive idle termination system which comprises novel and unique features. Particularly, the preferred embodiment of the invention contemplates an electronic excessive idle termination unit which is readily installable in existing automotive type vehicles either as original equipment or as an after-market accessory. One feature of the present invention is that the excessive idle termination unit is readily adaptable to accept different configurations of sensed input conditions. Another feature is that it may be employed in conjunction with different types of warning devices to alert the operator to the imminent shut down of the engine before such shut down actually occurs thereby allowing the operator time to correct the condition which gave rise to the actuation of the unit. Compactness of package size and reliability are benefits of electronic circuit construction.

Among the possible sensed input conditions are: seat occupancy vs. seat unoccupiedness; actuation of the emergency brake vs. release of the emergency brake; and engagement of the transmission vs. disengagement of the transmission. It may be desirable to override the system in certain instances, and therefore provision is made to allow for such override features to be incorporated. Specifically, it may be desirable to override the system when the hood is opened for servicing the engine compartment and the unit is adapted to accept a hood override switch which, when actuated by the opening of the hood, prevents the ignition from being cut off by the unit. There is also the possibility of a temperature override wherein the unit is precluded from shutting down the engine unless the engine has warmed up.

The foregoing features, advantages and benefits of the invention, along with additional ones, will be seen in the ensuing description and claims which should be considered in conjunction with the accompanying drawing.

BRIEF DESCRIPTION OF THE DRAWINGS

The drawings disclose presently preferred embodiments of the invention according to the best mode presently contemplated in carrying out the invention.

DESCRIPTION OF THE PREFERRED EMBODIMENTS

Figure 1:
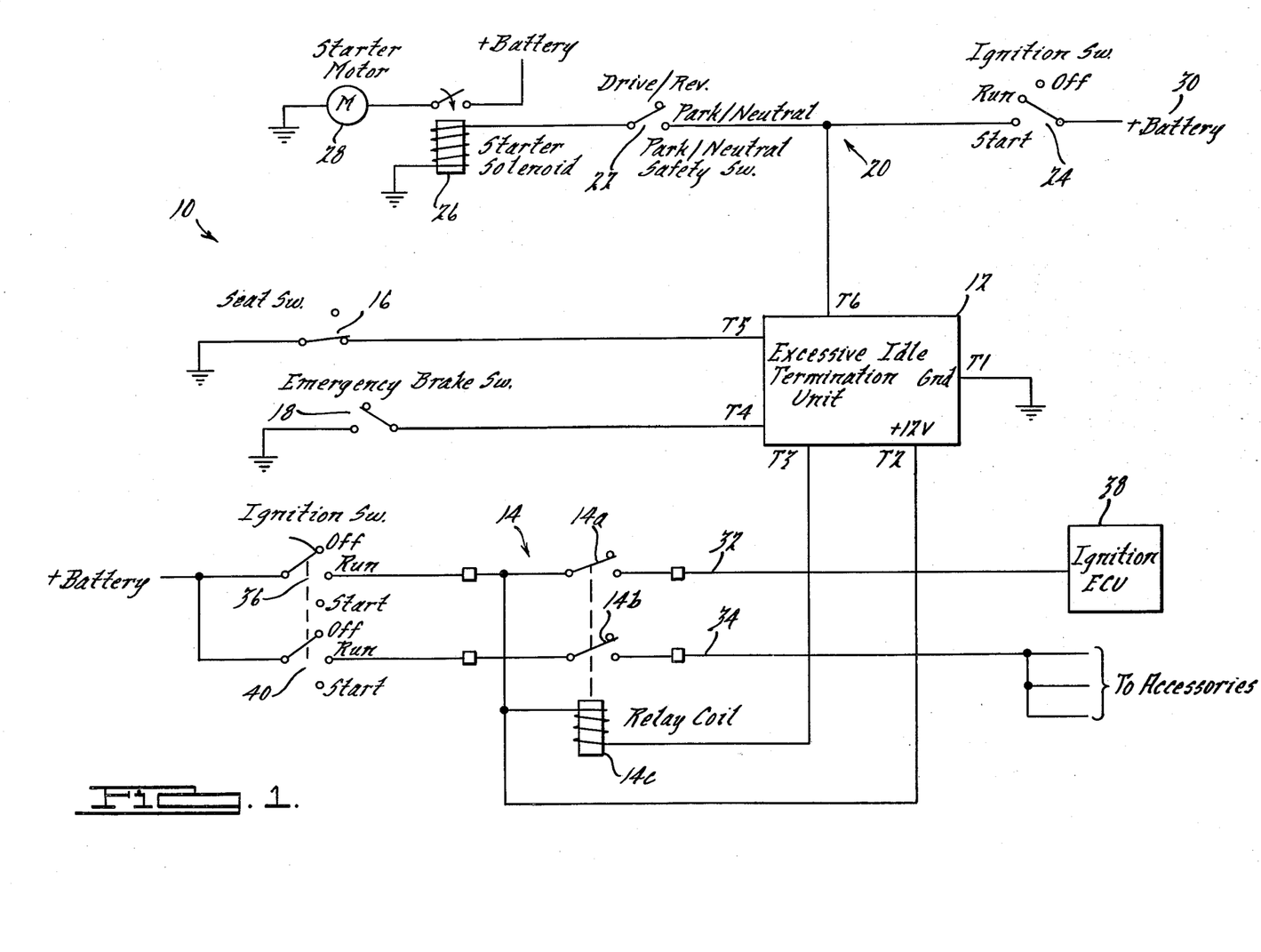
FIG. 1 is an electrical schematic wiring diagram of an excessive idle termination system embodying principles of the present invention in association with the relevant portion of a motor vehicle's electrical system.

FIG. 1 illustrates the relevant portion of one motor vehicle's electrical system containing the excessive idle termination system 10 of the present invention. The excessive idle termination system 10 comprises an excessive idle termination unit 12 and a relay 14. The embodiment senses one or more input conditions and for this purpose in the disclosed embodiment there is employed a seat switch 16 for sensing occupancy of the operator's seat and an emergency brake switch 18 for sensing whether the emergency brake (not shown) is applied or released. The embodiment is disclosed in conjunction with a vehicle having an automatic transmission and because of this, it is deemed desirable to sense the condition of the automatic transmission. For this purpose, the disclosed excessive idle termination unit 12 is associated with the starter circuit 20 and the starter circuit contains the park/neutral safety switch 22 which senses engagement vs. disengagement of the transmission. Focusing in greater detail on FIG. 1 the starter circuit 20 comprises, in addition to the park/neutral safety switch 22, a "start" contact 24 on the usual ignition switch, and the usual starter solenoid 26 and the starter motor 28. These circuit elements are connected in circuit as shown in association with the vehicle battery 30 which is a conventional DC 12 volt battery. The excessive idle termination unit 12 comprises six electrical terminals, and the starter circuit is connected with the terminal which is identified by the reference designation T6. The connection to such terminal is from the junction of the ignition switch contact 24 and the park-/neutral safety switch 22 as illustrated.

The seat switch 16 is a normally closed device, that is being closed when the seat is unoccupied but which opens in response to seat occupancy. Seat switch 16 is connected in circuit as shown in association with the terminal identified by the reference numeral T5 of unit 12. The emergency brake switch 18 is a normally open switch, that is being open when the emergency brake is released but closing when the emergency brake is applied. This switch is connected in circuit as shown in association with the terminal of unit 12 identified by the reference numeral T4.

Relay 14 is connected in circuit in association with unit 12 and with the ignition circuit 32 and the accessory circuit 34. The ignition circuit 32, absent the excessive idle termination system, comprises a "run" contact 36 of the ignition switch and the ignition electronic control unit (ECU) 38. Absent the excessive idle termination system, the ignition circuit is operative such that when the ignition switch is operated to either the start or run position, there is completed an energizing circuit from the battery to the ignition ECU 38 which, in response to a source of trigger pulses (not shown), is operative to fire the spark plugs via the usual coil and distributor thereby powering the engine. With the incorporation of the excess idle termination system, one set of contacts 14a of relay 14 is connected in circuit between the ignition switch contact 36 and the ignition ECU 38 as illustrated in the drawing figure.

The accessory circuit 34, absent the excess idle termination system, comprises a number of accessory circuits which are fed through an accessory contact 40 of the ignition switch whereby when the ignition switch is in either the run or the accessory position the battery is connected to the accessories. With the incorporation of the excess idle termination system a second set of contacts 14b of relay 14 are connected in circuit between the ignition switch accessory contact 40 and the accessories as shown in the drawing figure.

The relay 14 comprises in addition to the two sets of contacts 14a, 14b, a relay coil 14c. One terminal of coil 14c is connected via contact 36 with the positive battery terminal and the other terminal of coil 14c is connected to the terminal identified by the reference designation T3 of excessive idle termination unit 12. The positive battery terminal is also coupled through contact 36 to the terminal identified by the reference designation T2 of unit 12. The terminal of unit 12 identified by the reference designation T1 is connected to ground, terminals T1 and T2 of unit 12 thereby being the means via which the unit is energized from the battery.

Before explaining details of the electronic circuit construction of unit 12 it is beneficial to explain the basic system operation in connection with FIG. 1.

Let it be assumed that the operator enters the vehicle, occupies his seat and releases the emergency brake, all before he operates the ignition switch to start the engine. This action places both the emergency brake switch and the seat switch in the open condition so that ground signals are removed from terminals T4 and T5 of unit 12 before engine starting is attempted. If the operator now actuates the ignition switch, contacts 36 closes to thereby energize excessive idle termination unit 12. The unit is thereby reset automatically (the manner in which it is reset will be explained later) and upon being reset the relay coil 14c is energized. The energization of the relay coil causes both contacts 14a and 14b to close whereby the ignition electronic control unit 38 is now energized via the ignition circuit 32 and the accessories are energized via the accessory circuit 34. Further actuation of the ignition switch to the start position now causes the contact 24 to close whereby the positive battery voltage is conducted to terminal T6 of unit 12 and (assuming that the automatic transmission is in either the part or neutral position so that switch 22 is also closed) to solenoid 26 whereby the starter solenoid is energized to in turn actuate starter motor 28 which cranks the engine. Due to the closure of the contacts 14a the ignition circuit is energized, and thus the cranking of the engine will cause it to start. Upon starting of the engine the operator will typically release the ignition switch from the start position so that it automatically returns to the run position to which it is typically spring biased from the start position, and this serves to disconnect the positive battery voltage from terminal T6 of unit 12. For reasons which will become apparent later on in connection with the detailed description of the unit 12, the operator must disengage the transmission from the park or neutral position during the timing period imposed by unit 12 or else unit 12 will operate to de-energize relay coil 14c and thereby interrupt the ignition circuit by opening the contact 14a. The intent of this mode of operation is not for the purpose of interrupting the warm-up mode of operation if it is deemed desirable to leave the transmission in park or neutral for more than the timing period of unit 12. Rather the purpose is to detect the placement of the transmission in either a neutral or park position for a duration which is deemed excessive once the engine has warmed up. Therefore, in the disclosed embodiment the engine will shut down during warm up if the automatic transmission is not moved from either the park or neutral position into one of the forward or reverse drive gears. Alternatively, it would be possible to avoid the inconvenience of having to restart the engine during warm up due to automatic shut down by incorporating a temperature sensor in association with the engine whereby the signal from the park neutral safety switch would not be acted upon by unit 12 until the engine has warmed up. (See FIG. 7).

Once the engine is running, if either the seat switch or the emergency brake switch closes, unit 12 begins a counting period leading to shut down if the closed condition is not corrected before the time elapses. For example, consider the situation where the vehicle operator leaves the seat yet does not shut off the engine. In this circumstance the excess idle termination unit 12 will operate to interupt the ignition if the operator has not reoccupied the seat prior to the timing interval's expiration. Similarly, if the emergency brake switch is closed by virtue of actuation of the emergency brake and this condition is not corrected before the allowable interval has expired, then the ignition will also be interrupted. This means that excessive idle conditions are not tolerated. Typically such idle conditions lead to excess wear on the engine, possibly elevated cooling system temperature in hot weather, and are generally wasteful of fuel. The incorporation of an excess idle termination system in a vehicle is advantageous in that the duration of these undesirable conditions is definitely limited.

Figure 2:
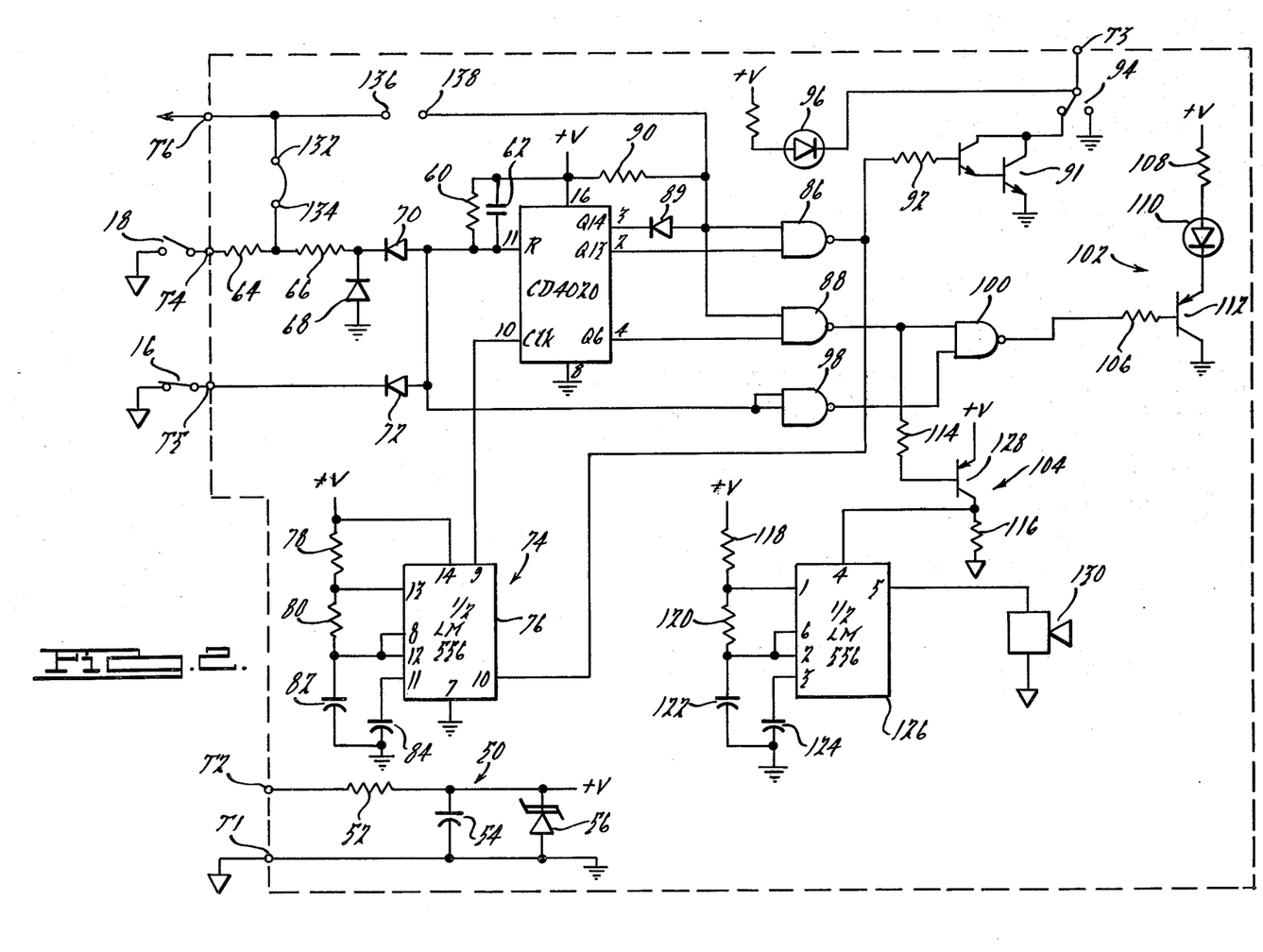
FIG. 2 is an electronic schematic circuit diagram of the excessive idle termination unit which is used in the system of FIG. 1.

Greater detail of the construction of unit 12 appears in FIG. 2. Unit 12 comprises a number of individual electronic circuit components connected as shown. Receiving the battery voltage at terminals T1 and T2 is a circuit 50 comprising a resistor 52, a capacitor 54 and a transient suppressor diode 56 connected as illustrated. The circuit 50 develops a potential +V volts which is the power supply for the electronic circuits contained within unit 12. The +V supply voltage is supplied to the circuit devices as shown in the drawing although the actual circuit connections may not be present in the drawing figure. Circuit 50 provides protection of the unit should the opposite polarity or too large a voltage be accidentally applied to terminals T1 and T2.

Unit 12 further comprises a counter circuit 56 having a plurality of input and output terminals which are designated as shown. The reference designations associated with counter 58 correspond to the manufacturer's terminal designations and these should not be confused with the reference designations utilized in conjunction with other circuit components which are also referenced to the manufacturer's designations and may be similar. The counter circuit 58 comprises a clock input CLK, a reset input R, power supply inputs +V and ground, and a plurality of output terminals three of which Q14, Q13, and Q6 are shown in the drawing. The +V supply is coupled to terminal R through a resistor 60 and a capacitor 62 in parallel. The input terminals of the unit which are connected to the external switches are coupled with terminal R via a plurality of circuit components including resistors 64, 66 and diodes 68, 70 and 72 connected in circuit as shown.

The clock terminal CLK is connected to a clock generator circuit 74 which comprises an electronic timer circuit 76, resistors 78, 80 and capacitors 82, 84 connected as shown. Briefly, the purpose is to supply clock signals to the clock terminal CLK of counter 58 with the circuit 58 counting the clock pulses when the predetermined conditions of the sensed input conditions so allow.

The output terminals Q6, Q13, Q14 are coupled with gate circuits 86, 88, and a diode 89 and a resistor 90 are in circuit with terminal Q14 as shown. The gate 86 controls the conductivity of a Darlington transistor 91 which is operatively coupled via terminal T3 to the relay coil 14c. The circuit connection includes a resistor 92 in the base of transistor 91, and there is a safety override switch 94 which may be employed in this circuit. A power-on indication in the form of an LED 96 is also associated with this particular circuit.

Audible and visible warning indications are also provided by additional circuitry which includes a gate 98 functioning as an inverter, a gate 100 and a visible warning circuit 102 and an audible warning circuit 104. The visible warning circuit 102 comprises resistors 106, 108, an LED 110 and a transistor 112. The audible warning circuit 104 comprises resistors 114, 116, 118, 120, capacitors 122, 124, a timer circuit 126, a transistor 128 and a warning buzzer 130 which are schematically connected in circuit as shown.

Briefly, one purpose of the warning signals is to alert the operator to the imminent shutdown of the engine unless he takes corrective action to alleviate the condition which has given rise to the possibility of shut down. Another purpose is to let the operator know after the fact that system 10 has been effective to shut down the engine.

The operation of the circuit is as follows. So long as power from the battery is supplied to unit 12, clock generator circuit 74 supplies a continuous train of clock pulses to the clock input CLK of counter circuit 58. Circuit 58 operates such that it counts the clock pulses received at its clock input terminal only so long as a ground (or low level) signal is present at the reset terminal R. Upon power-ups, capacitor 62 couples the voltage rise of the +V power supply to reset terminal R momentarily creating a positive (or high level) potential at the reset terminal which causes the counter circuit to be placed in the reset condition. Assuming that the condition of the various input switches is such that no low level signal is coupled through to reset terminal R then counter circuit 58 remains in the fully reset condition, even though clock pulses are being continuously supplied to the clock input. In the reset condition, gate 86 supplies a high level output signal through resistor 92 to the base of Darlington transistor 91 causing Darlington transistor 91 to be placed in conduction. A conductive path to ground is thereby provided from terminal T3 so that relay coil 14c is thus energized. With coil 14c energized, the vehicle may be started in the usual manner.

Let the operation of seat switch 16 now be considered. If, after the engine has been started, the seat becomes unoccupied, switch 16 closes so that a low level signal is conducted through diode 72 to reset terminal R of counter circuit 58. Now, counter circuit 58 begins counting the clock pulses. Counter circuit 58 is a digital type device which counts in binary fashion with the various output terminals such as Q14, Q13, Q6 corresponding to binary digits (or bits).

It may now be explained that the bit Q14 is more significant than the bit Q13 which is in turn more significant than the bit Q6. It should also be recognized that not all of the available output terminal bits of circuit 58 are utilized. Rather only those bits are utilized which provide the desired timing relationships hereinafter described. It will be appreciated that this particular choice of utilization of bits is merely exemplary and that other possible combinations may be used within the scope of the invention. The waveform appearing at terminal Q6 will be essentially a square wave alternating between high and low levels and having a predetermined frequency. The signal at terminal Q13 and the one at Q14 will similarly be square wave signals but having successively lower frequencies. In the examples, the frequency of the clock pulses is set such that the signal at terminal Q13 has a period of 20 seconds and the signal at terminal Q14 a period of 40 seconds. The period of the Q6 signal is much shorter.

At this point it should be mentioned that each logic gate 86, 88 is a NAND logic gate which functions to provide a low (or logic 0) output signal only when all input logic signals to it are at a high (or logic one) logic level. Because the signal at Q14 will remain at a low logic level for the first 40 seconds of operation after the emergency brake switch has closed, there is no external effect during this 40 second time period. However, after this 40 second time period the logic signal at Q14 switches to a high logic level. This creates an effect on gate 88 whereby it passes the signal at its other input. This means that the effect of the Q6 signal is now transmitted to NAND gate 100. The effect of the Q13 logic signal would be transmitted through gate 86 of transistor 90, but for the fact that the terminals Q14, Q13 represent immediately adjacent binary digits which means that Q13 goes from high to low coincidental with the transition from Q14 from low to high. Thus, there is no immediate effect at the output of gate 86 and transistor 90 continues to remain conductive. In the case of gate 88, the much higher frequency of Q6 now causes the output signal at gate 88 to alternate at the frequency of the signal Q6, and the effect is that the output of NAND gate 100 also toggles at this same frequency and in turn switches transistor 112 on and off at this same frequency thereby causing the LED warning lamp 110 to blink in on and off fashion. It is this blinking of the warning light in on and off fashion which is intended to afford the operator the opportunity to take corrective action so as to avoid an unwanted shut-down of the engine.

It will also be noted that the signal from the output of gate 88 is supplied to circuit 104. Circuit 104 is configured to sound the warning buzzer 130 whenever transistor 128 is switched into conduction to supply an energizing +V potential to the supply terminal of device 126. The resistors and capacitors associated with device 126 define the audible buzzer frequency. Thus, the signal at the output of gate 88 coupled through to the base of transistor 128 switches this transistor on and off at the frequency of the waveform appearing at terminal Q6 and in turn this causes the warning buzzer to be intermittently buzzed at the same frequency as the blinking of warning light 110. The warning buzzer serves the same purpose in that it is intended to provide a prewarning alert to the operator that he should take corrective action if he wishes to avoid an unwanted shutdown of the engine by unit 12.

If the operator fails to take corrective action, then upon the elapse of the 60 seconds from the time the pulses were initially counted, both Q14 and Q13 will be at high logic levels. The output signal at gate 86 now changes and this causes transistor 91 to be rendered nonconductive. Accordingly, relay coil 14c is deenergized and the ignition circuit 32 is interrupted thereby shutting down the engine. The signal from gate 86 is also coupled back to a control input of circuit 74 to terminate the operation of circuit 76 such that clock pulses cease to be supplied to the clock input of circuit 58. Thus, once the 60 seconds have elapsed, further counting by circuit 58 is prevented and the output signal of circuit 58 remains fixed until the circuit is reset. This means that the relay 14 will continue to remain de-energized. It also means that the warning lamp will remain on continuously. If it is desired to override the effect of the shutdown, the override switch 94 may be actuated to the other position. Such override switch is not intended to be a defeat device enabling the operator to defeat the system but rather it is disclosed for the purpose of being incorporated into the unit where it may be accessible only to a skilled service technician.

In view of the foregoing description of operation with respect to the operation of the seat switch it is believed readily apparent that the closure of the emergency brake switch will cause the system to be operated in exactly the same manner. Thus, if the operator applies the emergency brake with the engine running, there will be prewarning signals given at the end of 40 seconds until 60 seconds have elapsed at which time the engine is shut down.

It may be noted that the circuit configuration which couples the emergency brake switch to terminal R is slightly different from the circuit configuration which couples the seat switch to terminal R. The reason for this is because of the interface with the starter circuit. It will be noted in the embodiment of FIG. 2 that there are internal terminals designated 132, 134, 136, 138. The terminals 132, 134 are jumped together while the 136, 138 remains open. With this arrangement the starter circuit is coupled via the jumper wire jumpering terminals 132, 134 through resistor 66, through the diode 70 to reset terminal R. In this way when the automatic transmission park/neutral safety switch 22 remains closed, thereby indicating the vehicle is in either park or neutral, there is a low signal applied to the reset terminal R which will cause counter 58 to count. This means that so long as the automatic transmission remains in either park or neutral, regardless of whether the seat is occupied or the emergency brake is released, unit 12 will operate to shut down the ignition after the condition ensues for 60 seconds. While this may be an inconvenience at warmup its purpose is intended to avoid wasting fuel later on when the operator puts the transmission in either park or neutral and yet remain in the vehicle without applying the emergency brake. The purpose of resistor 64 therefore is to isolate the emergency brake switch from the battery potential which is applied to terminal T6 when the start contact 24 is closed so as to avoid a dead short to ground. The purpose of the diodes 70 and 72 is to isolate the respective input paths from each other and the diode 68 provides voltage suppression. The resistors 60, 66, 64 also form a voltage divider with respect to terminal R.

The circuitry within unit 12 interconnecting starter circuit 20 and emergency brake switch 18 also affords the vehicle operator the convenience of restarting the engine with the emergency brake applied after unit 12 has shut down the engine, but without him having to turn the ignition switch to the off position. This is a desirable feature and may be particularly useful when the vehicle is on an incline. (Please note that if the ignition switch is first turned to the off position before an attempted restart, unit 12 powers down because contact 36 opens thereby removing the power applied across the input terminals T1, T2 of unit 12. The subsequent closure of contact 36 upon the attempted restart will once again power up unit 12 and the powering up of unit 12 itself acts to reset counter 58.)

Upon the closure of start contact 24 the positive battery voltage is coupled through to the junction of resistors 64 and 66. Resistor 64 is sufficiently large to avoid a direct short to ground through the closed emergency brake switch. The closed emergency brake switch, prior to the closing of the start switch contact, has created a path from +V through resistor 60, diode 70, resistors 66 and 64 to ground with the voltage dividing effect of resistors 64, 66 and 60 being such that the signal at the reset input R was logically low. However closure of start contact 24 interrupts that current flow in such a manner as to allow the +V signal to reset the counter. It is to be noted that the resetting of the counter is accomplished not by current being drawn from the starter circuit but rather is caused by the change in circuit conditions internally of unit 12. Thus, it is in this manner the unit allows the vehicle to be restarted with the emergency brake applied without the ignition switch having to be turned off. (It should also be pointed out that this mode of operation just described presumes that the seat switch is open which would typically be the case where the operator is attempting to restart the engine with the emergency brake applied. The circuit arrangement is such that if the seat switch were closed to indicate an unoccupied seat, that signal would override the others since it is coupled directly through diode 72 to reset terminal 58. Thus, under such a condition of seat unoccupiedness it is impossible to restart the engine without turning the ignition switch off once the counter has timed out regardless of whether the emergency brake is applied or not.)

In summary then unit 12 operates such that upon initial power up (i.e., ignition switch contacts 36 and 40 closed) relay 14c will be energized for 60 seconds allowing the engine to be started during this time period irrespective of the condition of the various input signals from the emergency brake switch and seat switch and the park/neutral switch. Engine shut down is avoided by placing all the aforementioned switches in their open conditions before elapse of the 60 second interval. If there is a shutdown, resetting is accomplished as explained above.

Figure 3:
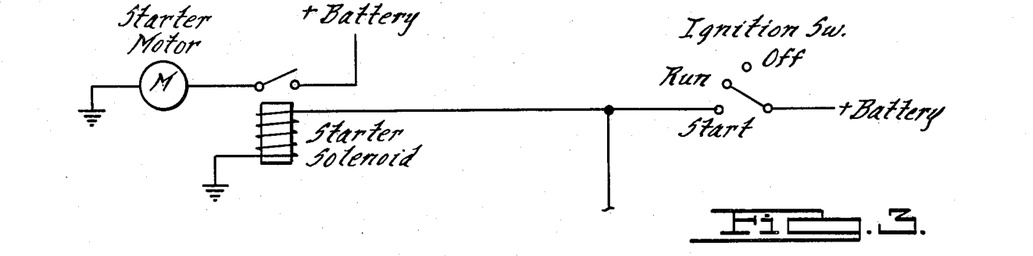
FIG. 3 is an electrical schematic diagram of a portion of another motor vehicle's electrical system illustrating another form of system with which the excessive idle termination system of the present invention may be used.
Figure 4:
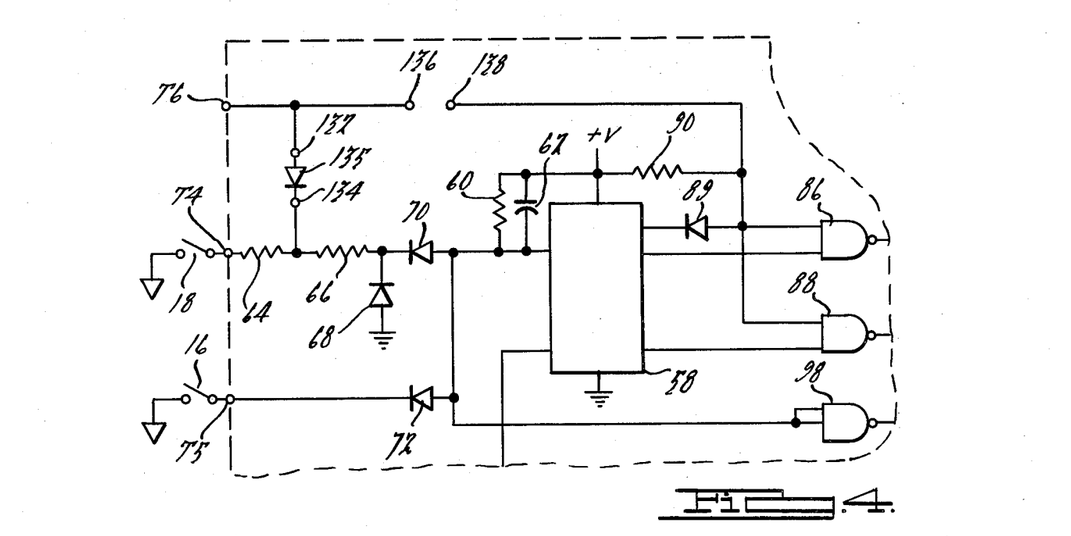
FIG. 4 is a fragmentary electric schematic diagram of a portion of the schematic diagram of FIG. 2 illustrating a further modification which adapts the unit for usage with the FIG. 3 electrical system.

FIG. 3 illustrates a starter circuit portion of a typical electrical system for a manual transmission vehicle. The difference between the starter circuit of FIG. 3 and that shown in FIG. 1 is that the starter circuit of FIG. 3 omits the park/neutral safety switch. In conjunction with the usage in a manual transmission vehicle, unit 12 is modified to the extent shown in FIG. 4. In FIG. 4, instead of a jumper between terminals 132 and 134, a diode 135 is connected as shown. The purpose of the diode 135 is to block current flow from unit 12 back through the starter solenoid 26 to ground through the path which would otherwise exist because of the direct path to ground through the starter solenoid from terminal T6 due to omission of the park/neutral safety switch. The operation of the system insofar as the excessive idle termination function is concerned is identical to that described except that in the manual transmission vehicle there are no park and neutral positions which will cause the unit to count.

Figure 5:
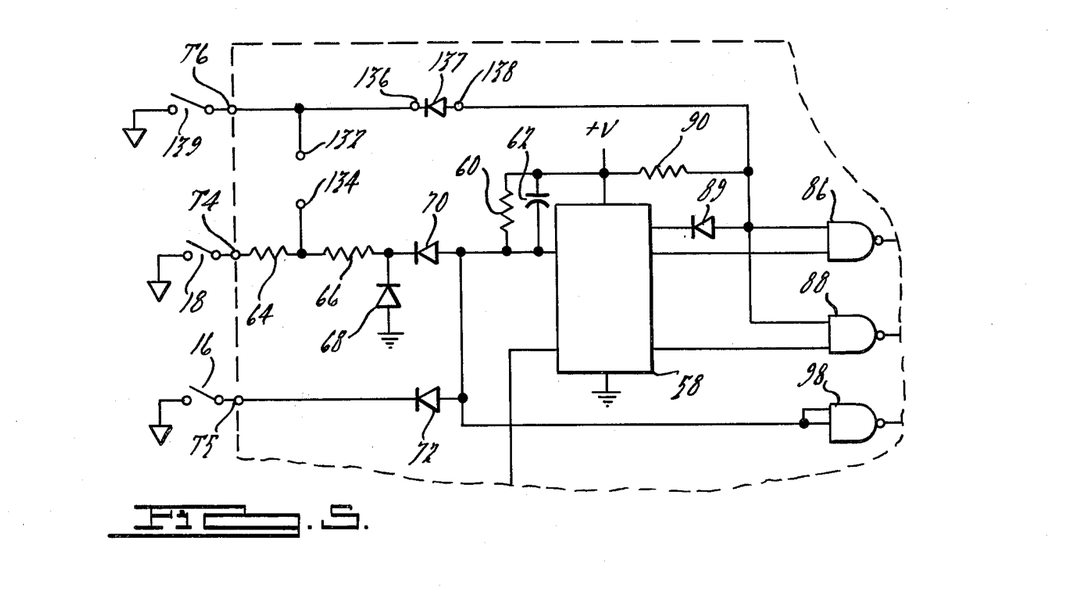
FIG. 5 is a fragmentary electronic schematic diagram of a portion of the schematic diagram of FIG. 2 illustrating a still further modification.

FIG. 5 illustrates a further modification to unit 12 wherein the circuit between terminals 132 and 134 is left open and there is a diode 137 connected between terminals 136 and 138 as shown. Instead of terminal T6 being connected to the starter circuit, it is instead connected to a underhood switch 139 which is operable to bypass the excess idle termination system. This embodiment is useful from the standpoint of engine compartment service considerations. The underhood switch is a device which closes when the hood is opened to thereby couple a ground signal through diode 137 to the input of gate 86, thereby to maintain a low signal to the input of gate 86 which causes transistor 91 to be held in conduction thereby energizing relay coil 14c and hold the ignition contact closed so long as the hood remains open. This effectively bypasses the excess idle termination unit when the hood is opened so as to allow the engine compartment to be serviced without the engine being shut down by the operation of unit 12 which would otherwise occur in response to either seat unoccupiedness or application of the emergency brake switch for an excessive interval. When the hood is once again closed, the hood switch opens thereby rendering unit 12 effective to operate in response to excess idle conditions in shutting down the engine. As far as operation of the emergency brake switch and the seat switch is concerned, both function in identical manners to that described in connection with the earlier embodiments. In other words, if either the seat is unoccupied or the emergency brake applied, unit 12 will operate to provide a prewarning signal leading to a final shut down of the engine if an excess idle condition has occurred.

Figure 6:
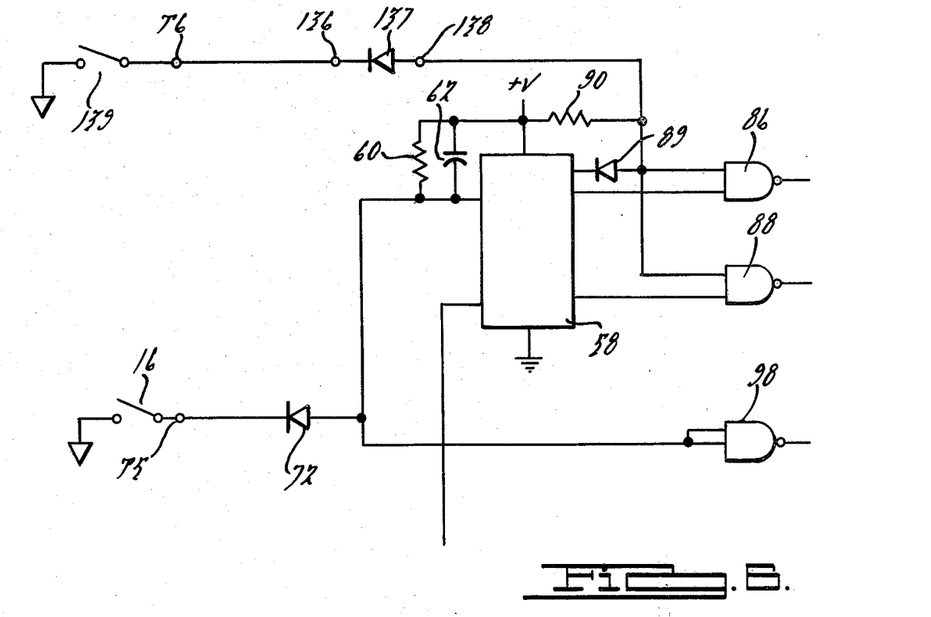
FIG. 6 is a fragmentary electronic schematic diagram of a portion of the schematic diagram of FIG. 2 illustrating another modification.

FIG. 6 discloses a system like FIG. 5 except that the emergency brake sensing function is omitted. In this embodiment the only external input to the reset terminal R of counter 58 is from the seat switch. The hood bypass function is also included. The operation is identical to that of FIG. 5 allowing for the fact that the unit is no longer responsive to the position of the emergency brake.

Figure 7:
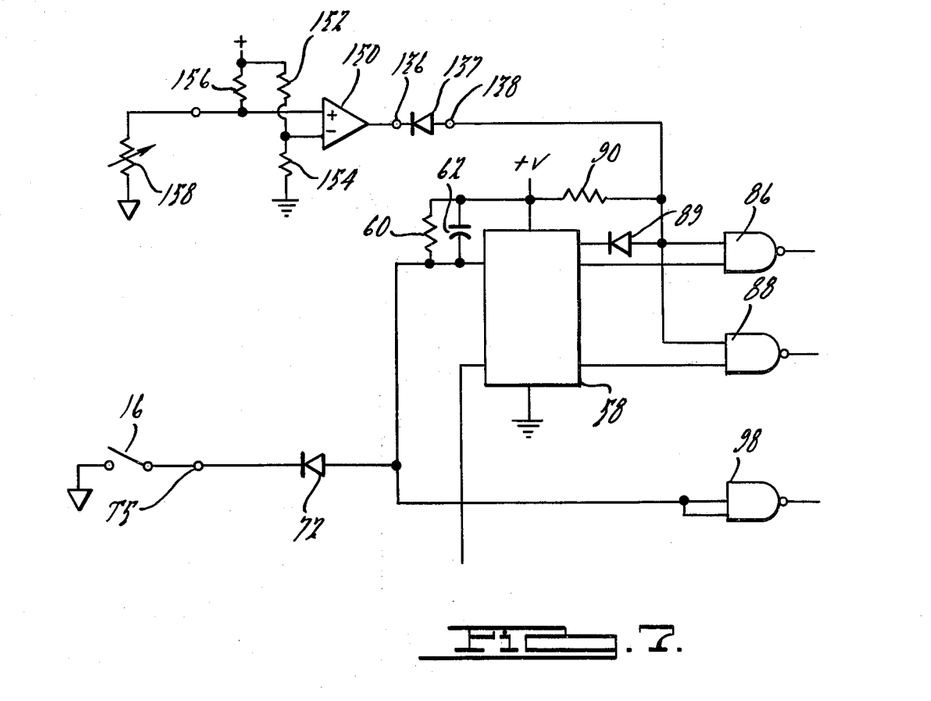
FIG. 7 is a fragmentary electronic schematic diagram of a portion of the schematic diagram of FIG. 2 illustrating yet another modification.

FIG. 7 discloses a still further embodiment which provides a temperature override feature. Specifically the temperature override feature is provided by a comparator 150, resistor 152, 154, 156, and a temperature sender 158 which are connected in circuit as shown. The circuit also makes use of the diode 137. Resistors 152, 154 are connected as a voltage divider across the supply potential to supply a reference to the inverting input of comparator 150. Resistor 156 and the temperature sender 158 form a second voltage divider which supplies an input to the non-inverting input of comparator 150. The output of comparator 150 is coupled through diode 137 to the input of gate 86. Temperature sender 158 is mounted to respond to engine temperature and for this purpose may be mounted on the engine to sense engine temperature. The arrangement provides a distinction between a cold engine and a warmed up engine. So long as the engine remains cold, the output of comparator 150 is such that a low signal is forced at the input of gate 86. By forcing this input of gate 86 transistor 91 is held in conduction so as to hold the ignition contacts closed. This in effect bypasses the excess idle termination function so long as the engine has not fully warmed up. However, once the engine has warmed up, the output of comparator 150 switches to remove the forcing signal at the input of gate 86 and this allows the excess idle system to function in the intended manner. This temperature override is a feature which is particularly desirable in cold weather climates where it is necessary to run the engine for prolonged periods under very cold conditions before the engine becomes warmed up. Were it not for this temperature override feature, the excess idle termination unit would shut down the engine after sixty seconds if the seat were unoccupied. If the operator has not returned to the vehicle within 60 seconds after it has fully warmed up, the excess idle termination unit will automatically shut down the engine so as to conserve fuel and avoid excess idling beyond that needed to achieve warm up.

While certain specific embodiments of the invention have been disclosed herein, it will be appreciated that the various features may be used individually or in combination. Thus, in certain vehicles, it may or may not be desired to interlock the unit with the transmission or with the hood switch or provide a temperature override feature. Moreover, the invention contemplates that any type of input condition indicative of an excess idle may be sensed to activate the excess idle unit, and thus, the fact that specific embodiments have been disclosed, does not preclude the use of sensing other than the seat switch and the emergency brake switch which are deemed to be indicative of excess idle. It may also be desirable to make the relay contacts 14a, 14b normally closed and to drive the relay coil 14c in a different manner whereby in response to an excess idle the relay coil is switched from a de-energized to an energized condition.

I claim:

1. An excess idle termination system for shutting down the engine of a vehicle by interrupting its ignition circuit upon the elapse of a predetermined time period deemed to constitute excess idle comprising:

- a multiplicity of switch means associated with conditions indicative of idle and operable in response to occurrence of said condition;
- a source of clock pulses;
- a binary counter circuit comprising a plurality of input and output terminals, one input terminal being a clock terminal for receiving clock pulses, another input terminal being a control terminal which controls the counting of clock pulses by the counter circuit, two output terminals corresponding to selected binary digits of the count in the count circuit;
- said binary counter circuit in communication with said source of clock pulses whereby said clock pulses are counted in response to operation of said switch means;
- a logic network in communication with the binary digits output of said binary counter circuit whereby the output of said logic network generates a signal in response to a predetermined status of binary digits at selected output terminals of said binary counter, depending on the value of the monitored input condition;
- said logic network further conditioned to respond to the attainment of said predetermined status of two binary digits and still further conditioned to generate a warning signal in response to the concurrent attainment of a predetermined status of only one of said two binary digits and a selected status of a third binary digit of the count in said binary counter circuit, which third binary digit is of lesser significance than that of said first two binary digits;
- a warning device;
- means coupling said logic network with said warning device to energize said warning device with said warning signal whereby the warning device is intermittently activated at the frequency of the warning signal;
- and means coupling the output of said logic network with the ignition circuit for interrupting the ignition circuit, in response to conditioning of said logic network output.

* * * * *